(12) United States Patent
Odate

(10) Patent No.: US 10,266,161 B2
(45) Date of Patent: Apr. 23, 2019

(54) VEHICLE BRAKE SYSTEM

(71) Applicant: HONDA MOTOR CO., LTD., Tokyo (JP)

(72) Inventor: Shotaro Odate, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 188 days.

(21) Appl. No.: 15/189,434

(22) Filed: Jun. 22, 2016

(65) Prior Publication Data

US 2016/0368466 A1 Dec. 22, 2016

(30) Foreign Application Priority Data

Jun. 22, 2015 (JP) ................................. 2015-124448

(51) Int. Cl.
| | |
|---|---|
| *B60T 7/22* | (2006.01) |
| *B60T 7/04* | (2006.01) |
| *B60T 13/14* | (2006.01) |
| *B60T 13/66* | (2006.01) |
| *B60T 13/68* | (2006.01) |
| *B60T 13/74* | (2006.01) |
| *B60T 8/1755* | (2006.01) |
| *B60T 8/40* | (2006.01) |

(52) U.S. Cl.
CPC ................ *B60T 7/22* (2013.01); *B60T 7/042* (2013.01); *B60T 8/17558* (2013.01); *B60T 8/4081* (2013.01); *B60T 13/146* (2013.01); *B60T 13/662* (2013.01); *B60T 13/686* (2013.01); *B60T 13/745* (2013.01); *B60T 2201/024* (2013.01); *B60T 2270/10* (2013.01)

(58) Field of Classification Search
None
See application file for complete search history.

(56) References Cited

FOREIGN PATENT DOCUMENTS

| | | |
|---|---|---|
| JP | 5-39011 A | 2/1993 |
| JP | 2007-145313 A | 6/2007 |

(Continued)

OTHER PUBLICATIONS

Office Action dated Apr. 18, 2017, issued in counterpart Japanese Patent Application No. 2015-124448, with English ranslation. (8 pages).

(Continued)

*Primary Examiner* — Rami Khatib
*Assistant Examiner* — Gerrad A Foster
(74) *Attorney, Agent, or Firm* — Westerman, Hattori, Daniels & Adrian, LLP

(57) ABSTRACT

A vehicle brake system includes a collision determination unit that determines whether collision of the vehicle occurs or not; and a second braking control unit that, when the collision of the vehicle is determined as occurring, causes at least either of an ESB system and a VSA system to perform emergency braking control of the vehicle, and causes the VSA system to perform ABS braking control based on an ABS brake demand depending on a slip state of each wheel, irrespective of whether a brake pedal is pressed down or not. In a case where the vehicle collides, where the brake operation is performed, and where the ABS braking control is performed, the second braking control unit causes the emergency braking control based on an emergency brake demand to be continued instead of the braking control based on the press-down operation of the brake pedal by a driver.

8 Claims, 5 Drawing Sheets

(56) References Cited

FOREIGN PATENT DOCUMENTS

| | | |
|---|---|---|
| JP | 2012-1091 A | 1/2012 |
| JP | 2015-36270 A | 2/2015 |
| JP | 2015-047980 A | 3/2015 |
| WO | 2012/157050 A1 | 11/2012 |

OTHER PUBLICATIONS

Office Action dated Nov. 28, 2017, issued in counterpart Japanese Application No. 2015-124448, with English machine translation. (10 pages).

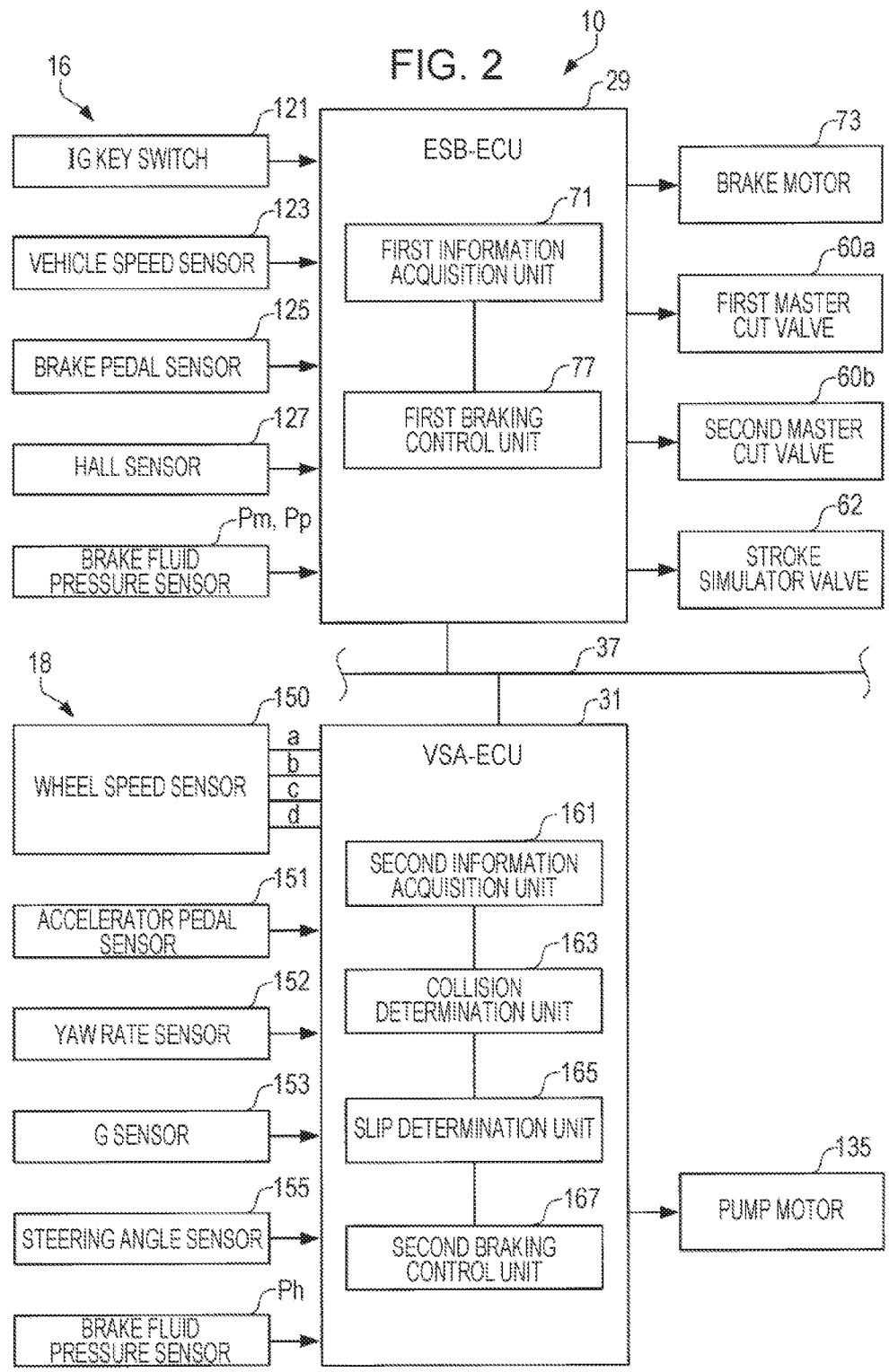

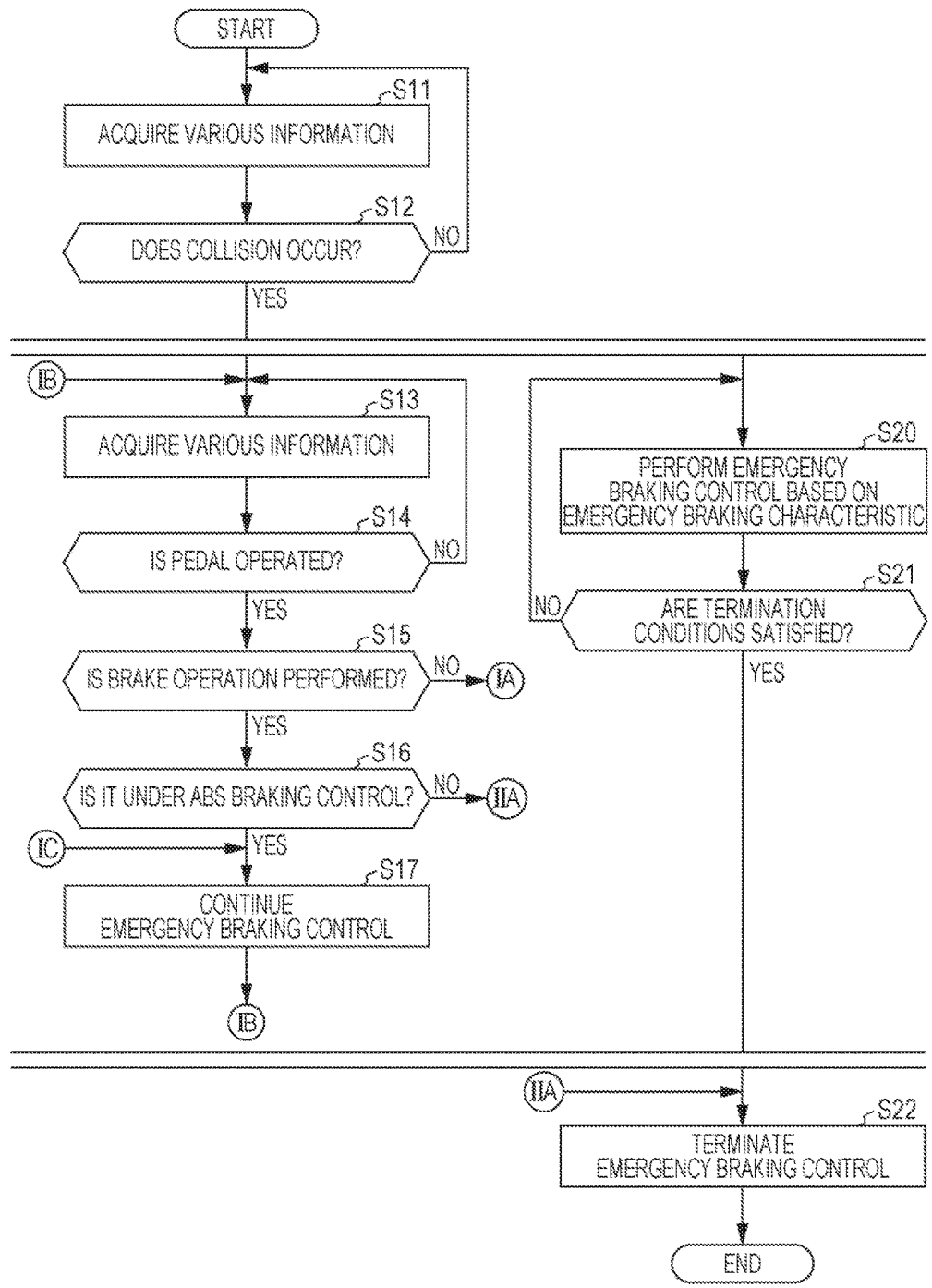

VEHICLE BRAKE SYSTEM

CROSS REFERENCES TO RELATED APPLICATIONS

The present application claims priority under 35 U.S.C. § 119 to Japanese Patent Application No. 2015-124448, filed Jun. 22, 2015, entitled "Vehicle Brake System." The contents of this application are incorporated herein by reference in their entirety.

TECHNICAL FIELD

The present disclosure relates to a vehicle brake system for braking a vehicle.

BACKGROUND

Japanese Unexamined Patent Application Publication No. 2012-1091 (hereinafter JP2012-1091) discloses an example of a vehicle brake system for braking a vehicle. The vehicle brake system according to JP2012-1091 includes a collision sensor for detecting collision of a vehicle equipped with the collision sensor (hereinafter also referred to as the vehicle simply), and a vehicle speed sensor for detecting the vehicle speed of the vehicle. When the collision sensor detects a collision of the vehicle, the vehicle brake system activates a brake control device by controlling an automatic braking time being a time for automatically generating a braking force, based on the vehicle speed detected by the vehicle speed sensor after detection of the collision.

The vehicle brake system according to JP2012-1091 is capable of setting the automatic braking time to a suitable time length depending on the collision currently happening, since the automatic braking time is controlled based on the vehicle speed after collision.

SUMMARY

However, the vehicle brake system according to JP2012-1091 does not consider a case where the vehicle is running on a low-friction road, such as, for example, a frozen road when collision of the vehicle occurs. Therefore, when the vehicle traveling on a low-friction road encounters a collision accident, there is a possibility that the vehicle brake system according to JP2012-1091 may not perform appropriate braking.

In view of the foregoing problem, it is desirable to provide a vehicle brake system capable of performing braking control of a vehicle concerned in an appropriate manner even when the vehicle encounters a collision accident while traveling on a low-friction road.

For achieving the above desirableness, a first aspect of the present disclosure provides a vehicle brake system that includes a brake pedal configured to be pressed down in a press-down operation by a driver in braking the vehicle; a brake fluid pressure generator configured to generate brake fluid pressure in response to a brake demand including the press-down operation; a collision determination unit configured to determine whether collision of the vehicle occurs or not; and a braking control unit configured to, when the collision determination unit determines that collision of the vehicle occurs, cause the brake fluid pressure generator to perform emergency braking control based on an emergency brake demand and perform ABS braking control based on an ABS brake demand based on a slip state of each wheel included in the vehicle, irrespective of whether the brake pedal is pressed down or not. In a case where the collision determination unit determines that the collision of the vehicle occurs, where the brake pedal is pressed down, and where the ABS braking control is performed, the braking control unit causes the brake fluid pressure generator to continue the emergency braking control based on an emergency brake demand.

In general, a braking distance by a braking control based on the press-down operation of the brake pedal by a driver not accustomed to the emergency brake operation while traveling on a low-friction road tends to be longer than a braking distance by the emergency braking control based on an emergency brake demand.

In view of this, in the case where the vehicle encounters a collision accident while traveling on a low-friction road, where the brake pedal is pressed down, and where the ABS braking control is performed, the braking control unit in the vehicle brake system according to the first aspect of the present disclosure causes the emergency braking control based on an emergency brake demand to be continued instead of the braking control based on the press-down operation of the brake pedal by the driver.

According to the first aspect of the present disclosure, the braking control of the vehicle may be performed in an appropriate manner even when the vehicle encounters a collision accident while traveling on a low-friction road.

A second aspect of the present disclosure provides the vehicle brake system of the first aspect, in which, in the case where the collision determination unit determines that the collision of the vehicle occurs, where the brake pedal is pressed down, and where the ABS braking control is not performed, the braking control unit causes brake fluid pressure generator to terminate the emergency braking control based on the emergency brake demand and perform the braking control based on the press-down operation.

According to the second aspect of the present disclosure, in the case where the vehicle encounters a collision accident while traveling on a non-low-friction road, where the brake pedal is pressed down, and where the ABS braking control is not performed, the braking control based on the press-down operation of the brake pedal by the driver is performed instead of the emergency braking control based on the emergency brake demand.

According to the second aspect of the present disclosure, a braking force based on the brake pedal press-down operation reflecting driver's intention may be secured when the vehicle traveling on the non-low-friction road encounters a collision accident.

A third aspect of the present disclosure provides the vehicle brake system according to first and second aspects, in which the braking control unit causes the brake fluid pressure generator to perform the ABS braking control based on the ABS brake demand according to the slip state of the wheel, when a predetermined delay time elapses after the start of the emergency braking control based on the emergency brake demand.

In general, immediately after the vehicle encounters a collision accident, the values of evaluation parameters for the ABS brake demand vary excessively such as sharp reductions of the vehicle speed and wheel speed. Therefore, there is a possibility that evaluation for the ABS brake demand may not be performed in an appropriate manner.

In view of this, the third aspect of the present disclosure provides the vehicle brake system in which the braking control unit causes the brake fluid pressure generator to perform the ABS braking control based on the ABS brake demand according to the slip state of the wheel, when the predetermined delay time elapses after the start of the emergency braking control based on the emergency brake demand. The predetermined delay time is set to an appropriate value in consideration of the time length taken from a time of collision to a time when the appropriate evaluation for the ABS brake demand is enabled after the collision of the vehicle.

In addition to the advantageous effects of the first and second aspects, the third aspect of the present disclosure may produces an effect in which an erroneous implementation of the ABS braking control may be avoided as much as possible.

The vehicle brake system according to the present disclosure may, for example, perform braking control of a vehicle concerned in an appropriate manner even when the vehicle encounters a collision accident while traveling on a low-friction road.

BRIEF DESCRIPTION OF DRAWINGS

The advantages of the disclosure will become apparent in the following description taken in conjunction with the following drawings.

FIG. 2 is a block diagram representing a peripheral configuration of ESB-ECU and VSA-ECU of the vehicle brake system.

FIG. 3A is a flowchart for illustrating the operation of the vehicle brake system.

DETAILED DESCRIPTION

Figure 1:
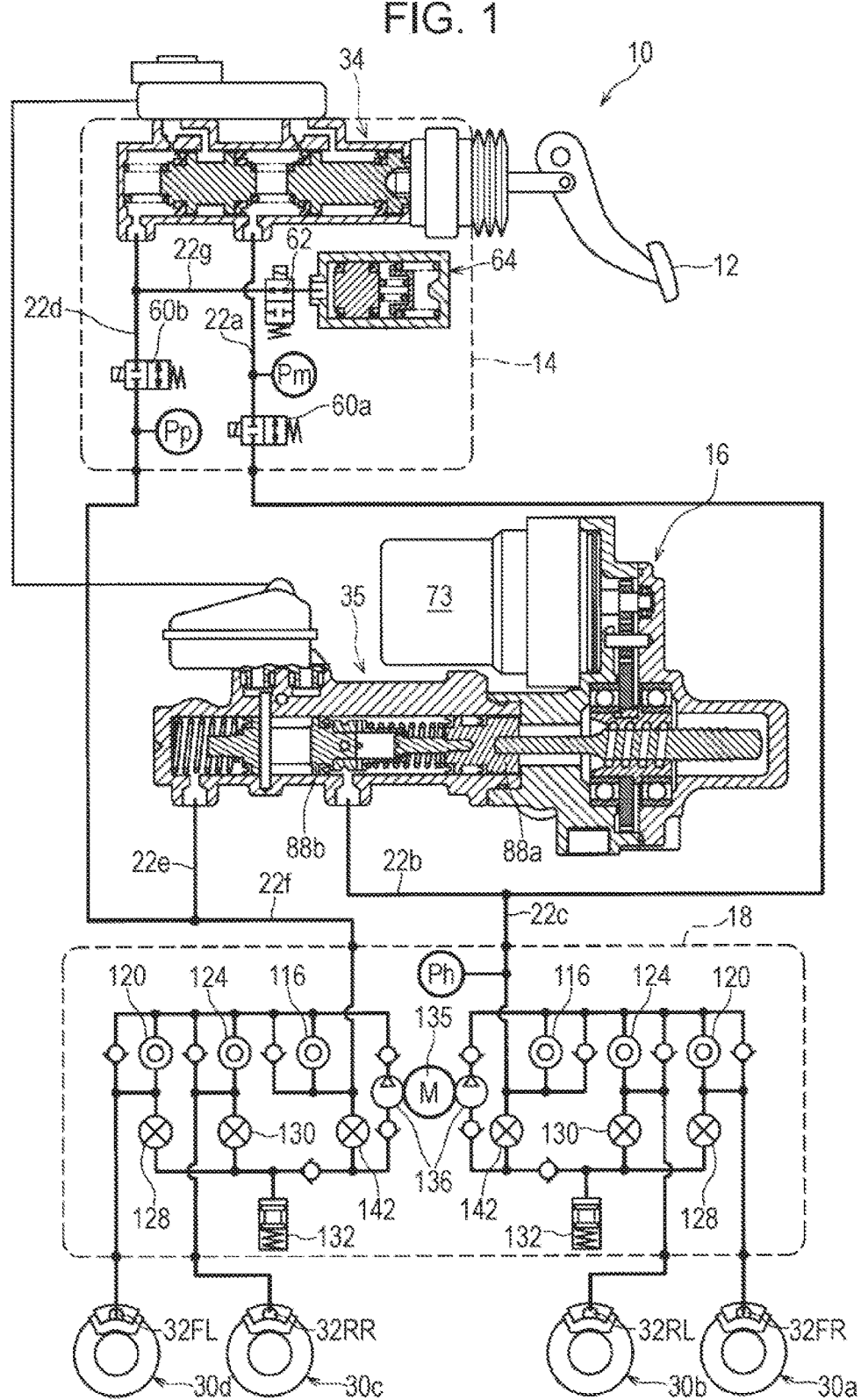
FIG. 1 is a configuration diagram representing an overview of a vehicle brake system according to an embodiment of the present disclosure.

Hereinafter, a vehicle brake system 10 according to the embodiments of the present disclosure is described in detail with reference to the accompanying drawings.

In the drawings referred to hereinafter, members having a common feature or members having a mutually corresponding feature are assigned, in principle, with a common reference numeral. For convenience of description, size and shape of the member may be schematically represented by deformation or exaggeration.

[Overview of Vehicle Brake System 10 According to Embodiments of Present Disclosure]

A vehicle brake system 10 according to the embodiments of the present disclosure includes a by-wire type brake system configured to generate a braking force via an electric system in addition to an existing brake system configured to generate a braking force via a hydraulic system.

As illustrated in FIG. 1, the vehicle brake system 10 includes a pseudo brake fluid pressure generator 14, an electric servo brake system (ESB system) 16 and a vehicle stability assist system (VSA system) 18 and so on. The pseudo brake fluid pressure generator 14, ESB system 16 and VSA system 18 are coupled with each other by mutually communicating via piping tubes 22a to 22f that circulate a brake fluid, as illustrated in FIG. 1.

The pseudo brake fluid pressure generator 14 is configured to convert a brake tread force inputted by a driver via a brake pedal 12 into pseudo brake fluid pressure. As illustrated in FIG. 1, the pseudo brake fluid pressure generator 14 includes a master cylinder 34, normally-open first and second master cut valves 60a, 60b, a pair of brake fluid pressure sensors Pm, Pp, and a stroke simulator 64.

The master cylinder 34 generates pseudo brake fluid pressure in response to operation of the brake pedal 12 by converting a brake tread force of the driver inputted via the brake pedal 12 into the pseudo brake fluid pressure.

The first and second master cut valves 60a, 60b are provided respectively inside the piping tubes 22a, 22b communicating and coupling the master cylinder 34 and ESB system 16 with each other. When the vehicle brake system 10 is in the normal operation mode, first and second master cut valves 60a, 60b are subjected to excitation control (with piping tubes 22a, 22b blocked) as illustrated in FIG. 1. Thus, communication between the master cylinder 34 and disc brake mechanisms 30a to 30d (including wheel cylinders 32FR, 32RL, 32RR, 32FL) for braking four wheels are blocked and thereby the disc brake mechanisms 30a to 30d are operated by using a brake fluid pressure generated by the ESB system 16.

When a vehicle concerned (not illustrated) encounters a collision accident, first and second master cut valves 60a, 60b are subjected to demagnetization control (to release the piping tubes 22a, 22d). Thus, brake fluid pressure generated in the master cylinder 34 is released toward the ESB system 16, and thereby the brake pedal 12 is retreated in the press-down direction. This acts to reduce an impact which the brake pedal 12 gives to the driver.

In the description below, when collectively referred to, wheel cylinders 32FR, 32RL, 32RR, and 32FL are referred to as wheel cylinder 32.

A pair of brake fluid pressure sensors Pm, Pp are provided respectively so as to interpolate in piping tubes 22a, 22b communicating and coupling the master cylinder 34 and ESB system 16 with each other. The brake fluid pressure sensor Pm has a feature of detecting pseudo brake fluid pressure generated in the master cylinder 34. The brake fluid pressure sensor Pp has a feature of detecting brake fluid pressure on the downstream side of the second master cut valve 60b.

The stroke simulator 64 is communicated with and coupled to the master cylinder 34 via a branch pipeline 22g branched from the piping tube 22d. The branch pipeline 22g is provided with an normally-closed stroke simulator valve 62 configured to open or close the branch pipeline 22g. When the vehicle brake system 10 is in the normal operation mode, the stroke simulator valve 62 is subjected to excitation control (with branch pipeline 22g opened) as illustrated in FIG. 1. Thus, the stroke simulator 64 elastically absorbs pseudo brake fluid pressure generated in the master cylinder 34 when the branch pipeline 22g is opened, and thereby acts to build up a pseudo reaction force in response to a press-down operation of the brake pedal 12 by a driver.

Even when the vehicle encounters a collision accident, the stroke simulator valve 62 is subjected to excitation control (with the branch pipeline 22g opened) as far as the vehicle brake system 10 operates normally.

The ESB system 16 has a feature of generating brake fluid pressure according to a pseudo brake fluid pressure generated in the master cylinder 34 or independently from the brake fluid pressure generated in the master cylinder 34. As illustrated in FIG. 1, the ESB system 16 includes a brake motor 73, first and second slave pistons 88a, 88b and so on. First and second slave pistons 88a, 88b are configured to receive a rotation drive force of the brake motor 73 and act to generate brake fluid pressure. The ESB system 16 corresponds to a "brake fluid pressure generator" according to the present disclosure.

The VSA system 18 has an ABS feature of preventing a wheel from being locked during brake operation; a traction control system (TCS) feature of preventing a wheel from slippage, for example, during acceleration; a feature of suppressing, for example, lateral slide when turning; and a feature of performing emergency braking control based on an emergency brake demand independently from a brake operation by the driver when collision of the vehicle occurs (it will be described in detail later). To implement those features, the VSA system 18 regulates brake fluid pressure generated in the ESB system 16 and thereby assists vehicle stability. The VSA system 18 corresponds to a "brake fluid pressure generator" according to the present disclosure.

To be more specific, the VSA system 18 includes a brake fluid pressure sensor Ph configured to detect brake fluid pressure generated in a slave cylinder 35 of the ESB system 16, a pressure pump 136 for pressurizing a brake fluid, a pump motor (pressure motor) 135 for driving the pressure pump 136, a regulator valve 116, a first in-valve 120, a second in-valve 124, a first out-valve 128, a second out-valve 130, a reservoir 132, a suction valve 142, and so on.

The VSA system 18 may have a configuration including the ABS feature only.

The following procedure may be adopted to regulate a VSA brake fluid pressure by operation of the VSA system 18. First, when the normally-closed suction valve 142 provided in a fluid supply path of the VSA system 18 is energized to open, the VSA system 18 drives the pressure pump 136 using the pump motor (pressure motor) 135. Then, the brake fluid suctioned via the suction valve 142 and pressurized by the pressure pump 136 is supplied to the regulator valve 116, first in-valve 120 and second in-valve 124 respectively.

The VSA system 18 energizes the regulator valve 116 to regulate the opening thereof and thereby regulates the VSA brake fluid pressure to a target fluid pressure and supplies a brake fluid of a pressure regulated to the target fluid pressure to wheel cylinders 32FR, 32RL, 32RR, and 32FL respectively via opened first in-valve 120 and second in-valve 124. Thus, the VSA system 18 controls a braking force of four wheels to a braking force corresponding to a target fluid pressure for each wheel even when a driver does not operate the brake pedal 12.

For example, assume that a right front wheel (FR) falls into a lock tendency (slip tendency) during braking. In such a case, the following procedure may be adopted to regulate a VSA brake fluid pressure for the right front wheel (FR) by operation of the VSA system 18.

That is, the VSA system 18 first energizes the normally-open first in-valve 120 provided in a fluid pressure path for the right front wheel (FR) to open and also energizes the normally-open first out-valve 128 to open. Thus, the VSA system 18 reduces the brake fluid pressure applied to the wheel cylinder 32FR of the right front wheel (FR) to a predetermined pressure by releasing to the reservoir 132. Then, the VSA system 18 de-energizes the first out-valve 128 to close. Thus, the brake fluid pressure applied to the wheel cylinder 32FR of the right front wheel (FR) is maintained.

As a result, as lock tendency of the right front wheel (FR) is canceled, the first in-valve 120 is de-energized to open, and the first out-valve 128 is de-energized to close. Thus, the brake fluid pressure (pressurized by the pressure pump 136 as necessary) from the ESB system 16 located on the upstream side of the VSA system 18 is increased to a predetermined pressure by acting on the wheel cylinder 32FR of the right front wheel (FR).

When the right front wheel (FR) falls into a lock tendency again due to the pressure increase, the above procedure of pressure reduction, holding, and pressure increase is repeated in this order. Thus, the VSA system 18 may perform ABS braking control of reducing the braking distance while preventing the right front wheel (FR) from falling into a lock state (slip state).

Although the above ABS braking control is described by using an example where the right front wheel (FR) falls into a lock tendency, the VSA system 18 may perform ABS braking control by using a similar procedure as above even when a wheel other than the right front wheel (FR) falls into a lock tendency.

Other elements of FIG. 1 are not directly related to the present disclosure. Therefore, description thereof is omitted.

[Basic Operation of Vehicle Brake System 10]

Next, basic operation of the vehicle brake system 10 is described.

In the vehicle brake system 10, a so-called by-wire brake system becomes active when a driver presses down the brake pedal 12 during normal operation of a below described ESB-ECU 29 (see FIG. 2) which controls the ESB system 16.

Specifically, in the normally operating vehicle brake system 10, when a driver presses down the brake pedal 12, first and second master cut valves 60a, 60b are closed as illustrated in FIG. 1, and with the stroke simulator valve 62 in an opened state, disk brake mechanisms 30a to 30d operate with brake fluid pressure generated by the ESB system 16.

Then, the brake fluid flows into the stroke simulator 64 via the stroke simulator valve 62 from the master cylinder 34. Thus, even when first and second master cut valves 60a, 60b are closed, flow of the brake fluid from the master cylinder 34 to the stroke simulator 64 occurs, and this causes a stroke to the brake pedal 12.

Meanwhile, in the vehicle brake system 10, for example, if a driver presses down the brake pedal 12 when the ESB system 16 falls into an abnormal state, an existing hydraulic brake system becomes active. Specifically, in the vehicle brake system 10 in an abnormal state, when a driver presses down the brake pedal 12, first and second master cut valves 60a, 60b are opened respectively and the stroke simulator valve 62 is closed, and brake fluid pressure generated in the master cylinder 34 is transmitted to the wheel cylinders 32FR, 32RL, 32RR, 32FL of the disk brake mechanisms 30a to 30d to activate the disk brake mechanisms 30a to 30d.

[Peripheral Configuration of ESB-ECU 29 and VSA-ECU 31 of Vehicle Brake System 10]

Next, peripheral configuration of the ESB-ECU 29 and VSA-ECU 31 of the vehicle brake system 10 according to the embodiment of the present disclosure is described with reference to FIG. 2. FIG. 2 is an illustrative diagram representing a peripheral configuration of the ESB-ECU 29 and VSA-ECU 31 of the vehicle brake system 10.

The ESB-ECU 29 and VSA-ECU 31 are coupled with each other in a manner allowing mutual information communication, for example, via a CAN communication medium 37 as illustrated in FIG. 2.

The CAN communication medium 37 is a multiplexed serial communication network widely used for information communication among vehicle-mounted devices. The CAN communication medium 37 has an excellent data transfer rate and error detection capacity. However, the "information communication medium" used in the embodiment of the present disclosure is not limited to the CAN communication medium 37. For example, FlexRay (trade mark) may be adopted as the "information communication medium" used in the embodiment of the present disclosure.

[Configuration of ESB-ECU 29]

As illustrated in FIG. 2, the ESB-ECU 29 is coupled with an ignition key switch (hereinafter abbreviated as "IG key switch") 121, a vehicle speed sensor 123, a brake pedal sensor 125, a hall sensor 127 and brake fluid pressure sensors Pm, Pp respectively, as an input system.

The IG key switch 121 is a switch operated when supplying power to parts of electrical components mounted on a vehicle via a vehicle-mounted battery (not shown). When the IG key switch 121 is turned on, power is supplied to the ESB-ECU 29 and VSA-ECU 31, and the ESB-ECU 29 and VSA-ECU 31 are activated.

The vehicle speed sensor 123 has a feature of detecting the traveling speed (vehicle speed) V of the vehicle. Information on the vehicle speed V detected by the vehicle speed sensor 123 is sent to the ESB-ECU 29.

The brake pedal sensor 125 has a feature of detecting the operation amount (stroke amount) and torque of the brake pedal 12 by a driver. Information on the operation amount and torque of the brake pedal 12 detected by the brake pedal sensor 125 is sent to the ESB-ECU 29.

The hall sensor 127 has a feature of detecting the rotation angle (current location information in the axial direction of slave pistons 88a, 88b) of the brake motor 73. Information on the rotation angle of the brake motor 73 detected by the hall sensor 127 is sent to the ESB-ECU 29.

The brake fluid pressure sensors Pm, Pp have a feature of detecting an upstream fluid pressure of the first master cut valve 60a and a downstream fluid pressure of the second master cut valve 60b in a brake fluid pressure system respectively. Fluid pressure information of components of the brake fluid pressure system detected by brake fluid pressure sensors Pm, Pp is sent to the ESB-ECU 29.

Meanwhile, as illustrated in FIG. 2, the ESB-ECU 29 is coupled with the brake motor 73, first and second master cut valves 60a, 60b and the stroke simulator valve 62 respectively as an output system.

As illustrated in FIG. 2, the ESB-ECU 29 includes a first information acquisition unit 71 and a first braking control unit 77.

The first information acquisition unit 71 has a feature of acquiring information on the on/off operation of the IG key switch 121, information on the vehicle speed V detected by the vehicle speed sensor 123, information on the operation amount and braking torque of the brake pedal 12 detected by the brake pedal sensor 125, information of the rotation angle of the brake motor 73 detected by the hall sensor 127, and information on brake fluid pressure of components detected by brake fluid pressure sensors Pm, Pp.

Also, the first information acquisition unit 71 has a feature of acquiring collision information as to whether collision of the vehicle occurs and fluid pressure information detected by the brake fluid pressure sensor Ph, sent from the VSA-ECU 31 via the CAN communication medium 37.

A first braking control unit 77 basically has a feature of controlling brake fluid pressure applied to the wheel cylinder 32 based on information on the brake operation acquired by the first information acquisition unit 71 and information on brake fluid pressure of components such that brake fluid pressure generated in the ESB system 16 follows a target brake fluid pressure corresponding to the brake operation.

When the vehicle brake system 10 is operating normally, the first braking control unit 77, which receives collision information about collision of the vehicle, controls so as to close first and second master cut valves 60a, 60b, block circulation of the brake fluid between the master cylinder 34 and the slave cylinder 35 and open the stroke simulator valve 62.

The ESB-ECU 29 includes a microcomputer including a central processing unit (CPU), a read only memory (ROM), and a random access memory (RAM) and the like. The microcomputer reads out and executes programs and data stored in the ROM, and operates to control execution of various features of the VSA-ECU 31 including various information acquisition features including collision information on whether collision of the vehicle occurs and a control feature of brake fluid pressure to be applied to the wheel cylinder 32.

[Configuration of VSA-ECU 31]

As illustrated in FIG. 2, the VSA-ECU 31 is coupled with a wheel speed sensor 150, an accelerator pedal sensor 151, a yaw rate sensor 152, a G sensor 153, a steering angle sensor 155, and a brake fluid pressure sensor Ph.

Wheel speed sensors 150a to 150d have a feature of respectively detecting the rotation speed (wheel speed) for each wheel. Information on the rotation speed for each wheel respectively detected by wheel speed sensors 150a to 150d is sent to the VSA-ECU 31.

The accelerator pedal sensor 151 has a feature of detecting the operation amount (stroke amount) of the accelerator pedal by a driver. Information on the operation amount of the accelerator pedal detected by the accelerator pedal sensor 151 is sent to the VSA-ECU 31.

The yaw rate sensor 152 has a feature of detecting the yaw rate generated in the vehicle. Information on the yaw rate detected by the yaw rate sensor 152 is sent to the VSA-ECU 31.

The G sensor 153 has a feature of respectively detecting the longitudinal G (longitudinal acceleration) and the lateral G (lateral acceleration) generated in the vehicle. Information on the longitudinal G and lateral G detected by the G sensor 153 is sent to the VSA-ECU 31.

The steering angle sensor 155 has a feature of detecting the steering amount and steering direction of the steering. Information on the steering angle of the steering detected by the steering angle sensor 155 is sent to the VSA-ECU 31.

The brake fluid pressure sensor Ph has a feature of detecting the brake fluid pressure in a fluid supply path of the VSA system 18 in the brake fluid pressure system. Information of fluid pressure in the fluid supply path of the VSA system 18 detected by brake fluid pressure sensors Ph is sent to the ESB-ECU 29.

Meanwhile, as illustrated in FIG. 2, the VSA-ECU 31 is coupled with the pump motor (pressure motor) 135 as an output system.

The VSA-ECU 31 includes a second information acquisition unit 161, a collision determination unit 163, a slip determination unit 165, and a second braking control unit 167.

The second information acquisition unit 161 has a feature of acquiring information on the rotation speed (wheel speed) for each wheel detected respectively by wheel speed sensors 150a to 150d, information on acceleration and deceleration operation amount of the accelerator pedal (not shown) detected by the accelerator pedal sensor 151, information on the yaw rate generated in a vehicle detected by the yaw rate sensor 152, information on the longitudinal G and the lateral G generated in the vehicle detected by the G sensor 153, information on the steering angle detected by the steering angle sensor 155, and information of fluid pressure in the fluid supply path of the VSA system 18 detected by the brake fluid pressure sensor Ph.

Also, the second information acquisition unit 161 has a feature of acquiring information on the vehicle speed V and information on the operation amount of the brake pedal 12, sent from the ESB-ECU 29 via the CAN communication medium 37.

The collision determination unit 163 has a feature of determining whether collision of the vehicle occurs, based on information on the longitudinal G and lateral G generated in the vehicle detected by the G sensor 153. The collision determination unit 163 determines that the vehicle has collided when at least both of the longitudinal G and lateral G exceed a collision determination threshold predetermined for each G.

Information of the determination result by the collision determination unit 163 as to whether collision of the vehicle occurs is referred to (as appropriate) when the second braking control unit 167 determines whether execution of the emergency braking control is necessary or not.

The slip determination unit 165 calculates the slip ratio SL by using the following formula (1) based on information on the vehicle speed V acquired by the second information acquisition unit 161 and information on the wheel speed for each wheel, and determines a slip state for each wheel based on whether the slip ratio SL for each wheel exceeds a predetermined slip ratio threshold SLth. Here, the slip ratio threshold SLth is set to an appropriate value in consideration of whether each wheel is in a slip state.

Slip ratio=(vehicle speed $V$–wheel speed)/vehicle speed $V$×100%     (Formula 1)

Information of determination result of the slip state of each wheel by the slip determination unit 165 is referred to when the second braking control unit 167 determines whether execution of the ABS braking control is necessary.

The second braking control unit 167 basically determines whether execution of the emergency braking control is necessary, based on information of the determination result by the collision determination unit 163 as to whether collision of a vehicle occurs. When a determination result indicates a determination that execution of the emergency braking control is necessary, a brake fluid pressure adjustment feature by the VSA system 18 based on emergency braking characteristic (see FIG. 4) used when collision of an own car occurs performs emergency braking control for each wheel. Here, the emergency braking control performed by the brake fluid pressure adjustment feature based on emergency braking characteristic corresponds to "emergency braking control based on emergency brake demand" of the present disclosure.

When a determination result by the slip determination unit 165 indicates a determination that any one of wheels falls in a slip state, the second braking control unit 167 performs the ABS braking control so as to terminate the slip state of the wheel. Here, the ABS braking control performed to terminate the slip state of the wheel corresponds to "ABS braking control based on ABS brake demand" of the present disclosure.

When the collision determination unit 163 determines that collision of the vehicle occurs, and then the brake pedal 12 is pressed down and the ABS braking control is not performed, the second braking control unit 167 operates so as to terminate emergency braking control based on the emergency brake demand and perform a braking control using the ESB system (brake fluid pressure generator) 16 by driving the brake motor 73 based on the press-down operation.

When the collision determination unit 163 determines that collision of the vehicle occurs, and then the accelerator pedal is pressed down and the accelerator pedal press-down operation amount AP exceeds a predetermined accelerator pedal operation amount threshold APth, the second braking control unit 167 terminates emergency braking control based on the emergency brake demand. Then, the second braking control unit 167 transmits a vehicle speed control signal based on the accelerator pedal press-down operation amount AP to an engine ECU (not shown) performing vehicle speed control via the CAN communication medium 37.

The accelerator pedal operation amount threshold APth is set to an appropriate value with which driver's intention to accelerate may be presumed.

When the collision determination unit 163 determines that collision of the vehicle occurs, then the brake pedal 12 is pressed down and the ABS braking control is performed, the second braking control unit 167 operates to continue emergency braking control based on the emergency brake demand.

The second braking control unit 167 corresponds to "braking control unit" of the present disclosure.

The VSA-ECU 31 includes a microcomputer including CPU, ROM, RAM, and so on. The microcomputer reads and executes programs and data stored in the ROM and controls various features including a feature of acquiring various information of the VSA-ECU 31 including information on the vehicle speed V, information on the wheel speed, and information on the operation amount of the brake pedal 12, a feature of determining as to whether collision of the vehicle occurs or not, a feature of determining as to a slip state of each wheel, a feature of executing emergency braking control by the VSA system 18 independently from brake operation of a driver when collision of the vehicle occurs, and a feature of selecting to terminate or continue emergency braking control based on an emergency brake demand depending on whether the ABS braking control is being performed when brake operation is performed at the time of collision of the vehicle.

[Description of Operation of Vehicle Brake System 10 Based on Flowchart]

Figure 3B:
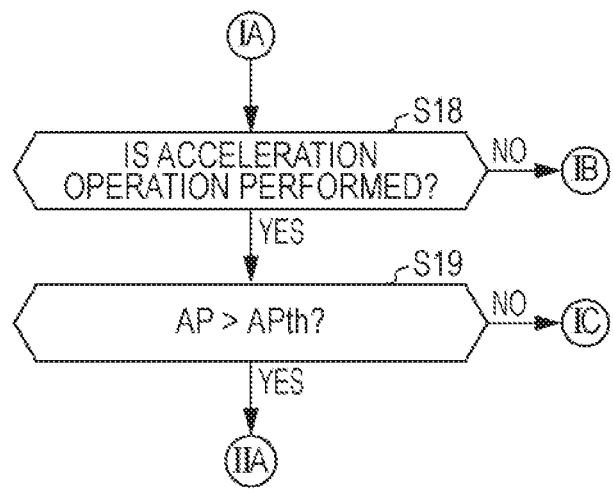
FIG. 3B is a flowchart for illustrating the operation of the vehicle brake system.
Figure 4:
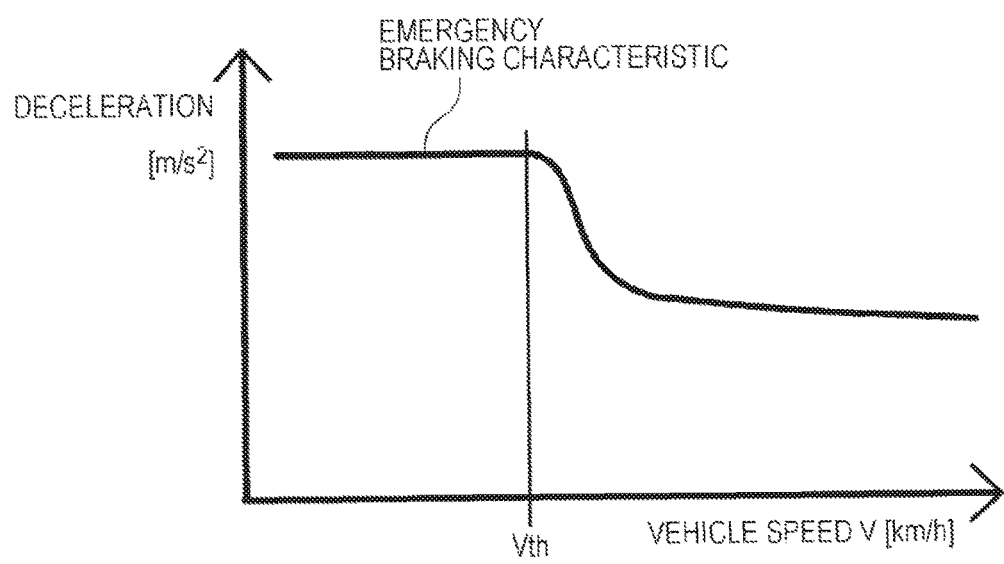
FIG. 4 is an emergency braking characteristic diagram representing an emergency braking characteristic used when a vehicle concerned collides.

Next, operation of the vehicle brake system 10 according to the embodiment of the present disclosure is described with reference to FIG. 3A, FIG. 3B and FIG. 4. FIG. 3A and FIG. 3B are flowcharts illustrating the operation of the vehicle brake system 10. FIG. 4 is an emergency braking characteristic diagram representing the emergency braking characteristic used when collision of the vehicle occurs.

In step S11 illustrated in FIG. 3A, the second information acquisition unit 161 of the VSA-ECU 31 acquires various information including information on the longitudinal G and lateral G generated in a vehicle detected by the G sensor 153 and information on the vehicle speed V detected by the vehicle speed sensor 123.

In step S12, the collision determination unit 163 of the VSA-ECU 31 determines whether collision of the vehicle occurs or not, based on information on the longitudinal G and lateral G acquired in step S11.

When a determination result in step S12 indicates a determination that collision of the vehicle does not occur ("No" in step S12), the VSA-ECU 31 returns the process flow to step S11 and repeats a loop processing of steps S11 to S12 until determined that collision of the vehicle occurs.

Meanwhile, when a determination result in step S12 indicates a determination that collision of the vehicle occurs ("Yes" in step S12), the VSA-ECU 31 proceeds the process flow to a time-divided parallel processing (step S13 and step S20 for emergency braking control). In the time-divided parallel processing, the VSA-ECU 31 appears to concurrently perform a loop processing of steps S13 to S17 (processing of determining whether continuing emergency braking control is necessary) and a loop processing of steps S20 to S21 (processing of emergency braking control).

In step S13, the second information acquisition unit 161 of the VSA-ECU 31 acquires information on a wheel speed of each wheel, information on the acceleration and deceleration operation amount of the accelerator pedal, and information on a vehicle speed V, and information on the operation amount of the brake pedal 12, sent from the ESB-ECU 29 via the CAN communication medium 37.

In step S14, the VSA-ECU 31 determines, based on information on the acceleration and deceleration operation amount of the accelerator pedal acquired in step S13 and information on the operation amount of the brake pedal 12, which pedal out of the accelerator pedal and the brake pedal 12 is operated.

When a determination result in step S14 indicates a determination that the two pedals are not operated ("No" in step S14), the VSA-ECU 31 returns the process flow to step S13 and repeats a loop processing of steps S13 to S14 until determined that any one of the two pedals is operated.

Meanwhile, when a determination result in step S14 indicates a determination that any one of the two pedals is operated ("Yes" in step S14), the VSA-ECU 31 proceeds the process flow to next step S15.

In step S15, the VSA-ECU 31 determines whether pedal operation determined in step S14 is a brake operation by the brake pedal 12. When both the accelerator pedal and brake pedal 12 are operated, the VSA-ECU 31 determines that brake operation is performed by the brake pedal 12.

When a determination result in step S15 indicates a determination that pedal operation determined in step S14 is a brake operation by the brake pedal 12 ("Yes" in step S15), the VSA-ECU 31 proceeds the process flow to next step S16.

Meanwhile, when a determination result in step S15 indicates a determination that pedal operation determined in step S14 is not a brake operation by the brake pedal 12 ("No" in step S15), the VSA-ECU 31 skips the process flow to a step S18.

In step S16, the second braking control unit 167 of the VSA-ECU 31 determines whether ABS braking control is being performed.

When a determination result in step S16 indicates a determination that ABS braking control is performed (under ABS braking control) ("Yes" in step S16), the VSA-ECU 31 proceeds the process flow to next step S17.

Meanwhile, when a determination result in step S16 indicates a determination that ABS braking control is not performed (not under ABS braking control) ("No" in step S16), the VSA-ECU 31 skips the process flow to a step S22 (termination of emergency braking control based on emergency brake demand).

In step S17, the second braking control unit 167 of VSA-ECU 31 causes to continue emergency braking control based on the emergency brake demand. Thereafter, the VSA-ECU 31 returns the process flow to step S13 and causes to execute subsequent processings sequentially.

When a determination result in step S15 indicates a determination that pedal operation determined in step S14 is not a brake operation by the brake pedal 12 ("No" in step S15), in step S18, the VSA-ECU 31 determines whether the pedal operation is an acceleration operation by the accelerator pedal.

When a determination result in step S18 indicates a determination that the pedal operation is an acceleration operation by the accelerator pedal ("Yes" in step S18), the VSA-ECU 31 proceeds the process flow to next step S19.

Meanwhile, when a determination result in step S18 indicates a determination that the pedal operation is not an acceleration operation by the accelerator pedal ("No" in step S18), the VSA-ECU 31 returns the process flow to step S13 and causes to execute subsequent processings sequentially.

In step S19, the VSA-ECU 31 determines whether the accelerator pedal press-down operation amount AP exceeds the accelerator pedal operation amount threshold APth.

When a determination result in step S19 indicates a determination that the accelerator pedal press-down operation amount AP exceeds the accelerator pedal operation amount threshold APth (a driver has intention to accelerate) ("Yes" in step S19), the VSA-ECU 31 skips the process flow to a step S22 (termination of emergency braking control based on emergency brake demand).

Meanwhile, when a determination result in step S19 indicates a determination that the accelerator pedal press-down operation amount AP does not exceed the accelerator pedal operation amount threshold APth (a driver has no intention to accelerate) ("No" in step S19), the VSA-ECU 31 returns the process flow to step S17 (continuing emergency braking control based on emergency brake demand) and causes to execute subsequent processings sequentially.

Meanwhile, in step S20, the second braking control unit 167 of the VSA-ECU 31 causes the brake fluid pressure adjustment feature by the VSA system 18 based on emergency braking characteristic (see FIG. 4) used when the vehicle has collided to perform emergency braking control for each wheel. Here, the emergency braking characteristic diagram illustrated in FIG. 4 indicates a characteristic of maintaining a predetermined deceleration irrespective of a vehicle speed at the time of collision in a vehicle speed region lower than the vehicle speed threshold Vth, and a characteristic represented by the relation of a recommended deceleration speed corresponding to a change of the vehicle speed V in a vehicle speed region higher than the vehicle speed threshold Vth.

"Emergency braking control based on emergency brake demand" according to the present disclosure is synonymous with emergency braking control based on the emergency braking characteristic (see FIG. 4).

In step S21, the VSA-ECU 31 determines whether termination conditions for the emergency braking control are satisfied. Here, the termination conditions for emergency braking control may be, for example, elapse of a predetermined period of time from the time of stoppage (with the vehicle speed of 0 km/h) and collision of the vehicle (or at the time when emergency braking control has started). This is because it is presumed that termination of the emergency braking control has no problem once the termination condition has been satisfied.

When a determination result in step S21 indicates a determination that termination conditions for emergency braking control are not satisfied (the vehicle is not stopped or a predetermined period of time has not elapsed since the time of collision) ("No" in step S21), the VSA-ECU 31 returns the process flow to step S20 and repeats the processing for emergency braking control of step S20 until determined that termination conditions for emergency braking control are satisfied.

Meanwhile, when a determination result in step S21 indicates a determination that termination conditions for emergency braking control are satisfied (the vehicle is stopped and a predetermined period of time has elapsed since the time of collision) ("Yes" in step S21), the VSA-ECU 31 proceeds the process flow to next step S22.

In step S22, VSA-ECU 31 causes to end the processing for the emergency braking control and then end the flow of a series of processings.

[Advantageous Effects of Vehicle Brake System 10 According to Embodiments of Present Disclosure]

Next, advantageous effects of the vehicle brake system 10 according to the embodiments of the present disclosure are described.

The vehicle brake system 10 according to a first aspect (corresponding to claim 1) includes a brake pedal 12 configured to be pressed down in a press-down operation by a driver in braking the vehicle, brake fluid pressure generators 16, 18 configured to generate brake fluid pressure in response to a brake demand (including an ABS brake demand) including the press-down operation of the brake pedal 12, a collision determination unit 163 configured to determine whether collision of the vehicle occurs or not, and a second braking control unit (braking control unit) 167 configured to, when the collision determination unit 163 determines that collision of the vehicle occurs, cause at least one of the ESB system 16 and the VSA system 18 to perform emergency braking control based on an emergency brake demand and perform ABS braking control based on an ABS brake demand depending on a slip state of each wheel included in the vehicle, irrespective of whether or not the brake pedal 12 is operated.

In general, a braking distance by braking control based on the press-down operation of the brake pedal by a driver not accustomed to the emergency brake operation while traveling on a low-friction road tends to be longer than a braking distance by the emergency braking control based on an emergency brake demand.

In view of this, in the case where the vehicle encounters a collision accident while traveling on a low-friction road, where the brake pedal 12 is pressed down, and where the ABS braking control is performed, the second braking control unit 167 in the vehicle brake system 10 according to the first aspect causes the emergency braking control based on the emergency brake demand to be continued instead of the braking control based on the press-down operation of the brake pedal 12 by the driver.

The vehicle brake system 10 according to the first aspect is capable of performing braking control of the vehicle in an appropriate manner even when the vehicle encounters a collision accident while traveling on a low-friction road. As a result, a braking distance of the vehicle may be reduced compared with a case of terminating the emergency braking control based on the emergency brake demand and performing the braking control based on the press-down operation of the brake pedal 12 by the driver.

In a vehicle brake system 10 according to a second aspect (corresponding to claim 2), the second braking control unit (braking control unit) 167 causes the emergency braking control based on an emergency brake demand to be terminated, and the braking control based on the press-down operation to be performed, in a case where the collision determination unit 163 determines that collision of the vehicle occurs, where the brake pedal 12 is pressed down, and where the ABS braking control is not performed.

In the case where the vehicle encounters a collision accident while traveling on a non-low-friction road, where the brake pedal is pressed down, and where the ABS braking control is not performed, the vehicle brake system 10 according to the second aspect may secure a braking force based on the press-down operation of the brake pedal reflecting driver's intention even when the vehicle encounters a collision accident while traveling on a non-low-friction road, since the braking control based on the press-down operation of the brake pedal by the driver is performed instead of the emergency braking control based on the emergency brake demand.

In general, immediately after the vehicle has encountered a collision accident, the values of evaluation parameters for the ABS brake demand vary excessively such as sharp reductions of the vehicle speed and wheel speed, and therefore there is a possibility that evaluation for the ABS brake demand may not be performed in an appropriate manner.

In view of this, in the vehicle brake system 10 according to the third aspect (corresponding to claim 3), the second braking control unit (braking control unit) 167 causes the ABS braking control based on an ABS brake demand depending on to a slip state of each of the wheels to be performed when a predetermined delay time elapses after the start of the emergency braking control based on the emergency brake demand.

In the vehicle brake system 10 according to the third aspect, the second braking control unit (braking control unit) 167 causes the ABS braking control based on an ABS brake demand depending on the slip state of the wheel to be performed when the predetermined delay time elapses after the start of the emergency braking control based on the emergency brake demand. Thus, in addition to the advantageous effects of the present disclosure related to the vehicle brake system 10 according to the first or second aspect, the vehicle brake system 10 according to the third aspect may produce an effect in which an erroneous operation of the ABS braking control may be avoided as much as possible.

Other Embodiment

Several embodiments described above are examples embodying the present disclosure. Therefore, it should be understood that the technical scope of the present disclosure is not limited to the embodiments. The present disclosure may be implemented in various ways without deviating from the spirit and main features thereof.

For example, an embodiment according to the present disclosure is described by using an example where the VSA-ECU 31 proceeds the process flow to the time-divided parallel processing (processing of determining whether emergency braking control is necessary, and processing of emergency braking control) when determining that collision of the vehicle occurs. However, the present disclosure is not limited thereto. Instead of performing the time-divided parallel processing, a VSA-ECU 31 having multiple CPUs operating in coordination with each other may be used and configured to cause each of the multiple CPUs to perform processing of determining necessity of continuing the emergency braking control and processing of the emergency braking control.

What is claimed is:

1. A vehicle brake system for braking a vehicle equipped with the vehicle brake system, the vehicle brake system comprising:
    a brake pedal configured to be pressed down in a press-down operation by a driver in braking the vehicle;

a brake fluid pressure generator configured to generate brake fluid pressure in response to a brake demand including the press-down operation;

a collision determination unit configured to determine whether collision of the vehicle occurs or not; and a braking controller configured to perform ABS braking control based on an ABS brake demand based on a slip state of each wheel included in the vehicle, the braking controller being configured to, when the collision determination unit determines that the collision of the vehicle occurs, cause the brake fluid pressure generator to perform emergency braking control based on an emergency brake demand, wherein in a case:
   where the collision determination unit determines that the collision of the vehicle occurs,
   where the brake pedal is pressed down, and
   where the ABS braking control is performed,
the braking controller continues to make the brake fluid pressure generator perform the emergency braking control based on the emergency brake demand instead of braking control based on the press-down operation of the brake pedal.

2. The vehicle brake system according to claim 1, wherein in a case where the collision determination unit determines that collision of the vehicle occurs, where the brake pedal is pressed down, and where the ABS braking control is not performed, the braking controller causes the brake fluid pressure generator to terminate the emergency braking control based on the emergency brake demand and perform braking control based on the press-down operation.

3. The vehicle brake system according to claim 1, wherein the braking controller causes the brake fluid pressure generator to delay performing the ABS braking control based on the ABS brake demand according to the slip state of the wheel until when a predetermined delay time elapses after the start of the emergency braking control based on the emergency brake demand.

4. The vehicle brake system according to claim 1, wherein the braking controller, after initiating the emergency braking control, determines whether the brake pedal is pressed down, and whether the ABS braking control is performed.

5. The vehicle brake system according to claim 4, wherein when it is determined that the brake pedal is pressed down, and the ABS braking control is not performed, the braking controller causes the brake fluid pressure generator to terminate the emergency braking control based on the emergency brake demand and perform braking control based on the press-down operation.

6. The vehicle brake system according to claim 1, wherein in a case:
   where the collision determination unit determines that the collision of the vehicle occurs,
   where the accelerator pedal is operated by pressing-down, and
   where accelerator pedal press-down operation amount exceeds a threshold amount, the braking controller terminates the emergency braking control.

7. A vehicle comprising a vehicle brake system comprising:

a brake pedal configured to be pressed down in a press-down operation by a driver in braking the vehicle;

a brake fluid pressure generator configured to generate brake fluid pressure in response to a brake demand including the press-down operation;

a collision determination unit configured to determine whether collision of the vehicle occurs or not; and a braking controller configured to perform ABS braking control based on an ABS brake demand based on a slip state of each wheel included in the vehicle, the braking controller being configured to, when the collision determination unit determines that the collision of the vehicle occurs, cause the brake fluid pressure generator to perform emergency braking control based on an emergency brake demand, wherein in a case:
   where the collision determination unit determines that the collision of the vehicle occurs,
   where the brake pedal is pressed down, and
   where the ABS braking control is performed,
the braking controller continues to make the brake fluid pressure generator perform the emergency braking control based on the emergency brake demand instead of braking control based on the press-down operation of the brake pedal.

8. A vehicle brake control method for braking a vehicle, the method comprising steps of:

determining, by using a computer, whether collision of the vehicle occurs or not; and in a case:
   where the collision of the vehicle occurs,
   where a brake pedal is pressed down, the brake pedal being configured to be pressed down in a press-down operation by a driver in braking the vehicle, and
   where ABS braking control is performed, the ABS braking control being performed based on an ABS brake demand based on a slip state of each wheel included in the vehicle, causing, by using the computer, a brake fluid pressure generator to continue emergency braking control based on an emergency brake demand instead of braking control based on the press-down operation of the brake pedal, the brake fluid pressure generator being configured to generate brake fluid pressure in response to a brake demand including the press-down operation.

* * * * *